MAGNETIC RECORDING SYSTEM

Filed June 30, 1958 11 Sheets-Sheet 1

INVENTOR
ERNEST G. NEWMAN

BY Murray Nanes
ATTORNEY

MAGNETIC RECORDING SYSTEM

July 27, 1965 E. G. NEWMAN 3,197,739

MAGNETIC RECORDING SYSTEM

Filed June 30, 1958 11 Sheets-Sheet 4

MAGNETIC RECORDING SYSTEM

Filed June 30, 1958 11 Sheets-Sheet 9

MAGNETIC RECORDING SYSTEM

United States Patent Office 3,197,739
Patented July 27, 1965

3,197,739

MAGNETIC RECORDING SYSTEM

Ernest G. Newman, Poughkeepsie, N.Y., assignor to International Business Machines Corporation, New York, N.Y., a corporation of New York Filed June 30, 1958, Ser. No. 745,731
7 Claims. (Cl. 340—172.5)

This invention relates to a magnetic recording system and more particularly to circuitry for compensating for imperfections in systems that read information from moving magnetic records.

In present day data processing machines, magnetic tape drive units, which act as input devices to the computer units of these machines, store characters on multi-channeled magnetic tape, each channel of which cooperates with a read/write circuit.

In writing, the characters are coded into a plurality of coded bits (1 or 0) and placed across the tape, one bit per channel.

Since it is desirable that the magnetic tape bear the information at very high densities and be fed through the machines at very high speeds, three major problems arise; skew, drive speed variations, and jitter.

The problem of skew may be caused by a number of factors. The tape may wiggle slightly while it is being fed, and the electrical components in each of the read/write circuits may produce slightly different delays, etc. Therefore, the bits being read from the different tracks of the magnetic tape by the read/write circuitry may be bits of different characters. That is, the bit of a character from one track may be read at a different time from another bit of the same character in another track. At the high densities of modern day tape drives, the bit of a character in one track may be as much as 5, 10 or even more bits behind the bit of the same character in one of the other tracks.

The second problem is caused by variations in the speed of the motors which drive the tape. This problem is also most significant in high density tape recording. In a well known type recording of digital information, a binary 1 bit on the tape produces an output pulse when sensed, while a binary 0 does not. In order to be able to recognize a binary 0, a clock must be provided for gating purposes. That is, if a 1 bit is present on the tape, a clock pulse will gate this 1 pulse through. If a 0 bit is on the tape, the fact that no pulse is gated through at the time of the clock pulse will indicate this. However, at high density, variations in speed of the tape and the use of a constant frequency clock will cause the information bits and clock pulses to get out of synchronism, and cause reading errors. A solution is to utilize circuitry which varies the frequency of the clock in synchronism with the change in speed of the tape drive. A burst of sync pulses recorded on the tape initially brings the clock into synchronism with the tape drive. Each 1 bit may be used thereafter for synchronizing purposes. Sync bits are also interspersed on the record to take care of a situation where there may be a long string of 0 bits unbroken by 1 bits.

The third problem is that of high frequency jitter which is defined as the variations in the frequency at which the bits of a single track are read. In high density recording, this is mainly caused by the interference between the different bits recorded on the tape and by variations produced in the circuit itself. The jitter problem may be eliminated by producing relatively broad pulses, representative of the bit being read, which is gated by a narrow clock pulse scheduled to come in the center of the broad bit pulse.

Another problem that arises is due to single defects in the magnetic properties of the record medium which in high density recording would effect a number of different consecutive bits of information in a track. By providing a variable frequency clock, the frequency of which remains relatively constant when there is a drop out of information for a small number of pulses, the clock will be able to gate out the information, when the information starts to come in again, with less chance of falling out of synchronism with the information. This is true because the clock is operating close to the last established information rate and the information rate will not change from that point very much, since speed variations are slow compared to the length of these dropouts. Therefore, the previously established rate is the best rate for the multivibrator to be at. The rest of the information is then read correctly and only the dropout pulses will be in error.

It is an object of the invention to provide an improved circuit for reading characters recorded at high densities on moving magnetic records.

Another object of the invention is to provide for each track of a record, a variable frequency clock which is used to gate out the information in a track.

Still another object of the invention is to provide a circuit for reading moving magnetic records which compensate for skew.

A further object of the invention is to provide a moving magnetic record read/write circuit which compensates for variations in the speed of the magnetic record drive.

A still further object of the invention is to provide a circuit for reading moving magnetic records which compensates for high frequency phase jitter.

Another object of the invention is to compensate for skew by providing a pair of registers for each track which are alternately filled, the information being read out from one set of registers when that set is filled and while the other set of registers is being read into from the tape.

Still another object of the invention is to provide novel means in skew compensation for indicating when each set of registers is filled.

A further object of the invention is to provide clocking means which is continuously adjusted so that its frequency agrees with the repetition rate of the information read from the tape.

A still further object of the invention is to provide compensation for record speed variation by providing a variable frequency clock, the speed of which varies with the record speed.

Another object of the invention is to provide initial synchronizing means consisting of a burst of pulses at the beginning of each record which brings the variable frequency clock into synchronism.

Still another object of the invention is to provide circuitry for determining when the synchronizing burst of pulses ends and the information pulses begin.

A further object of the invention is to provide a variable frequency clock which produces clock pulses, and half-period clock pulses which automatically fall in between the clock pulses.

A still further object of the invention is to provide a variable frequency clock for each tape channel, each clock of which is able to operate independently from the others.

Another object of the invention is to provide a variable frequency clock which varies with the rate that 1 bits are read from the magnetic record and in spite of the fact that there are discontinuities when 0 bits are being sensed.

Still another object of the invention is to provide a form of memory in the variable frequency clock so that the clock may continue to produce pulses at the previously established rate in spite of the fact that there are discontinuities when 0 bits or dropout of information are being sensed.

Another object of the invention is to provide a variable frequency clock which is used to gate out information bits, but which does not get out of synchronism if there is a dropout of information, so that a dropout does not effect the gating of later pulses, and only the bits in the dropout pulses are in error.

A further object of the invention is to provide a variable frequency clock which constantly adjusts to the rate that information pulses are being read from the magnetic record.

A still further object of the invention is to provide a variable frequency clock which sets a multivibrator at a proper level during initial synchronization from which synchronizing times are minimized.

Another object of the invention is to provide an improved variable frequency clock which requires a smaller number of initial synchronizing pulses because the multivibrator rate is initially set at an average level.

Still another object of the invention is to provide a variable frequency clock which if 1 pulses are absent tends to drift back to the average frequency.

A further object of the invention is to provide comparing means which compares the rate that bits are being read from the tape with the rate of the multivibrator, and frequency adjusting means which adjust the multivibrator to the rate that the bits are being read.

A still further object of the invention is to provide a variable frequency clock which has a long memory, short synchronizing time and a short adjustment time.

Another object of the invention is to provide a variable frequency clock which has a synchronizing time which is different and independent from its memory time.

Still another object of the invention is to provide a multivibrator, the output of which delivers clock pulses and another output of which delivers half-period pulses which are used to generate saw tooth pulses which in turn are compared with information pulses as received from the record, in order to produce an error voltage if they differ in frequency and to utilize the error voltage to continuously adjust the frequency of the multivibrator.

A further object of the invention is to provide a variable frequency clock which uses a balanced time discriminator as a comparer which can accommodate variations in the saw tooth voltage which might give erroneous correction.

A still further object of the invention is to provide a sensing circuit which makes use of a broad information pulse and a sharp clock pulse to eliminate high frequency jitter.

Another object of the invention is to eliminate high frequency jitter by using half-period pulses to trigger the saw tooth, and then since the information pulses will start very close to the time of the clock pulse, using a fixed delay of the clock pulse equal to approximately half the width of the information pulse, before producing a gating pulse.

Still another object of the invention is to provide a circuit using a clock which is independent of the noise pulses and, in which, if a noise pulse which can not be eliminated is sensed, will produce only a single error and not effect the reading of the following pulses.

Other objects of the invention will be pointed out in the following description and claims and illustrated in the accompanying drawings, which disclose, by way of example, the principle of the invention and the best mode, which has been contemplated of applying that principle.

In the drawings:

FIG. 1 is an overall functional block diagram showing two channels of a seven channel tape skew elimination circuit.

FIGS. 2A, 2B, and 2C arranged end to end in a horizontal sequence from left to right in that order, comprise a logical circuit diagram of one channel of FIG. 1.

FIG. 3 is a logical block circuit diagram of the variable frequency clock of FIG. 2.

FIGS. 4A and 4B, arranged edge to edge in a vertical sequence from top to bottom in that order, comprise a detail circuit diagram of the logical block diagram of FIG. 3.

FIGS. 5A and 5B arranged edge to edge in a vertical sequence from top to bottom in that order, are timing diagrams illustrating the operation of the circuit diagram of FIG. 2.

Figure 1:
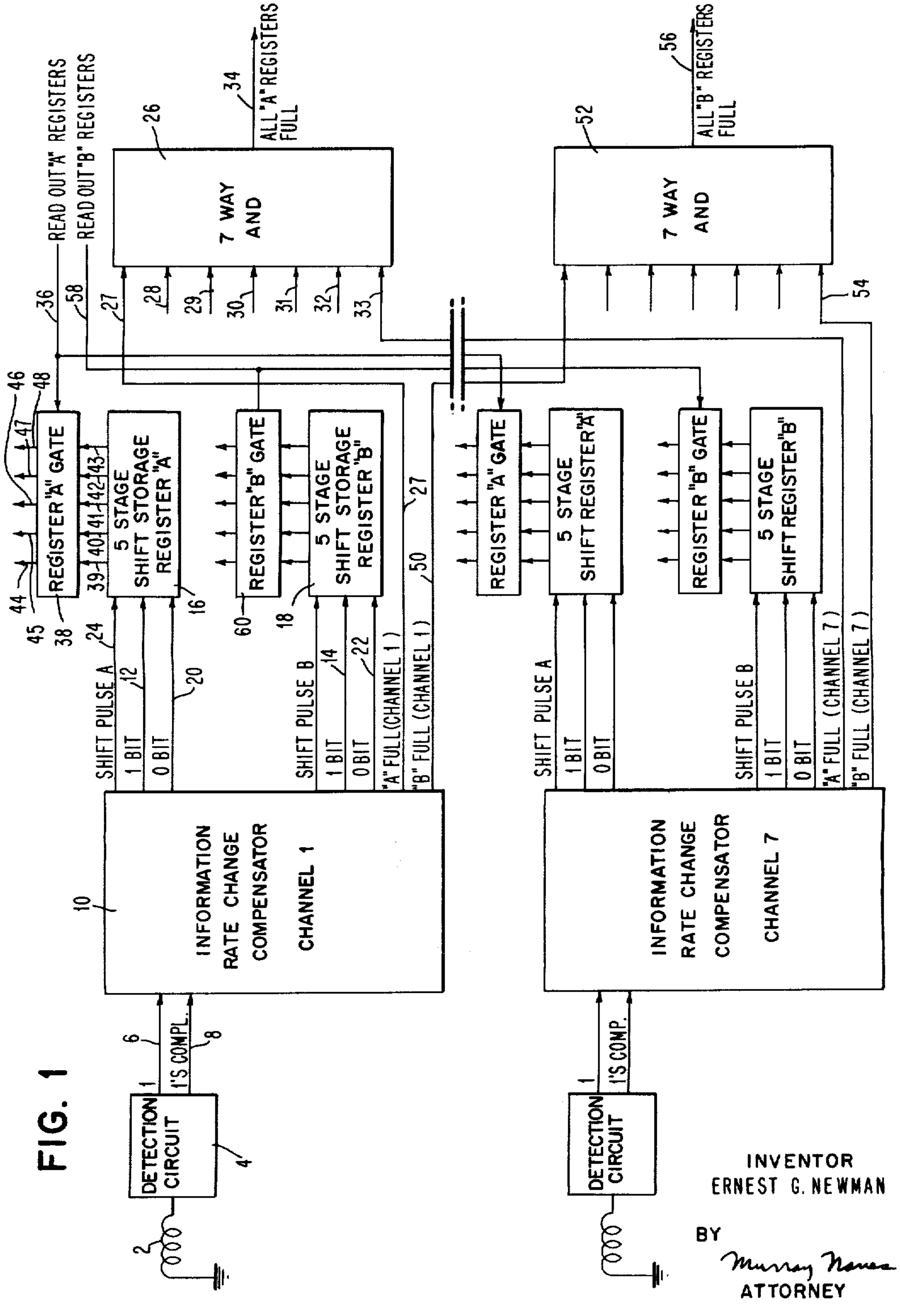

Alphabetic and numeric characters may be recorded on multi-track magnetic tape. In the binary notation, only two digits are employed, i.e., 0 and 1. The decimal digit 0 is represented by a binary digit 0 and the decimal digit 1 is represented by a binary digit 1. These binary digits are referred to as bits. The digital position or orders in a binary number, reading from right to left, corresponds in value $2,^0$ $2^1$, $2^2$, $2^3$, etc. or decimal digits 1, 2, 4, 8, etc., respectively. For example, a binary number 1001 represents the decimal digit 9, which is determined by the addition of the decimal digits 1 and 8 indicated by a binary 1 in the extreme right and extreme left binary positions, respectively. Hence, by using binary bits or pulses in groups of four, any decimal digit from 0 to 9 inclusive, may be written in the binary notation. The preferred embodiment has a tape seven channels wide on which a seven bit code may be used in which the first four bits are used for numeric representation, the fifth and sixth bits are for zoning (to expand the code to include alphabetic and special characters), and the seventh bit is for checking. The seven bits across the tape comprise a character, a group of characters comprise a record, and each tape may contain many records. Further details of such a system are described in the patent application entitled, "Tape Code Translator" to W. E. Burns et al., Serial Number 575,595, filed April 2, 1956, now Patent No. 2,939,116.

In the magnetic data recording system contemplated by the invention, the tape is customarily read when being driven so that each record track moves past a reading head which senses the magnetic information on the tape because of the varying magnetic flux produced in the reading head. A coil encircles the reading head and has induced in it, by the varying flux, an electrical current which varies proportionally to the rate of change of the flux. This current is then translated electrically by detection circuits. A well known system for reading magnetic records utilizes the amplitudes of the induced electric current as an indication of a binary 1 or 0 at any given interval.

Different systems have been used for magnetically recording the binary data. The system contemplated by the invention is known as the NRZI (non-return to zero) system. In this system a binary 0 is indicated by maintaining the magnetic condition of the track constant at either one of two values (above or below 0) throughout one bit period. A binary 1 is indicated by shifting the magnetic condition between the two values during the bit period. The magnetic heads and the detection circuits known in the art can produce an output pulse for every change in flux i.e., for every 1 bit. The detection circuit produces a 1's and 1's complement output which may be fed to a circuit which contains a clock that gates out a 1 pulse on a 1 output line if there is a 1 indication at the time of the clock pulse, or a 0 pulse on the 0 output line if there is a 1's complement indication at the time of the clock pulse. The 1 and 0 information leads are fed to either an A register or a B register. The pair of shift registers A and B are used as part of the skew elimination circuit.

At the high bit density at which this circuit has been designed to operate (3,000 bits per inch of track) it may be possible for the bit of a character in one track to be as much as thirty bit periods behind the bit of that character in another track. To compensate for this skew condition, it is necessary to use a pair of thirty stage shift registers to compensate for thirty bits of skew. For purposes of illustration, the shift storage registers have been shown as five stage registers to compensate for 5 bits of skew between tracks.

Each channel has, therefore, a five stage A shift storage register and a five stage B shift storage register. When an A register of a particular channel has been filled, a signal in the form of a pulse is transmitted to indicate this fact. When all the A registers are full, a signal is produced which is transmitted to a computer of the type which normally utilizes a tape drive machine as an information input source and all the information in the A registers are read into the computer simultaneously. As each individual A register is filled, an indication is produced and any new information in that channel is then transmited to the B register for that track. The length of the registers is selected so that the B registers will never be completely filled until all the A registers are filled. When the B registers are filled an operation similar to that of the A registers occurs and all the B registers are emptied simultaneously.

The clock which produces the pulses necessary for gating out the read pulses and for other timing is a variable frequency clock which varies in frequency with the speed of the taps. To bring the clock into synchronism, a series of 1 pulses, hereinafter called sync pulses, are recorded at the beginning of each record on each track of the magnetic tape. In actual practice, about 16 sync pulses are recorded on the magnetic tape at the beginning of the record. It takes an average of about 8 sync pulses to bring the frequency of the clock in synchronism with the sync pulses.

In the scheme used in the preferred embodiment, the recognition of the first 0 bit after the burst of sync pulses is an indication that the burst of sync pulses have ended. It is also possible to have a coded pattern recorded on the tape to indicate the end of the synchronizing burst.

Since there is a possibility that in any channel there may be a long string of 0's, a sync pulse is recorded before every five information pulses in order to prevent drift of the clock. The clock uses both the synchronizing pulses and the 1's for synchronization.

Before storage in the shift registers, the synchronized pulses are separated from the information. This decreases the length of the required shift registers and results in a saving of equipment.

In FIG. 1, the block diagram circuitry for the first and seventh channels only, of a seven channel tape system are shown.

It may be understood that the other channels would have similar circuitry. Referring to FIG. 1, the channel 1 coil 2 of a magnetic head (not shown) is connected to a detection circuit 4. If a 1 bit is detected by the detection circuit 4, a 1 bit lead 6 will produce an output pulse. If there is no 1 bit detected, then a 1's complement lead 8 at the output of detection circuit 4 will be a positive pulse. The 1 lead 6 and the 1's complement lead 8 are connected to an information rate change compensator 10, which comprises a clock, to be later described, that gates out a pulse on either a 1 output lead 12 or a 1 output lead 14 when a 1 bit is detected by the detection circuit 4. 1 bit output lead 12 will have a pulse when the 1 bits are being read into a 5 stage "A" shift storage register 16, and 1 bit lead 14 will produce a pulse when 1's are being read into the 5 stage "B" shift storage register 18. Similarly, a 0 bit lead 20 transmits a 0 bit indication to the "A" register 16 and the 0 bit lead 22 transmits the 0 bit indication to the "B" register 18.

Assume that the information is to be read into the "A" register 16. If the first information pulse is a 1 bit, the 1 bit lead 12 will transmit a pulse to the "A" register 16, where it enters the first stage. Shortly thereafter, a shift pulse "A" lead 24 from the information rate change compensator produces a pulse which shifts the 1 bit in the first stage of the "A" register 16 to the second stage. Similarly, a 0 bit coming over lead 20 would go into the first stage of "A" register 16 and be shifted by a pulse on lead 24 to the second stage, leaving the first stage empty in a condition ready to accept the next bit. Each time there is a shift pulse on lead 24, all of the bits shift without disturbing the sequence. After 5 bits have entered "A" register 16, a sixth bit which is a sync bit will be sensed. The sensing of the sixth bit will produce an output condition on an "A" full lead 27 which is connected to a 7 way AND circuit 26. Leads 28 through 33 inclusive from tape channels 2 through 7 inclusive, respectively, are also connected to the 7 way AND circuit 26. When each of the "A" full leads 27 through 33 inclusive indicate a full condition, an output pulse is transmitted from the 7 way AND 26 through an all "A" register full lead 34 to a computer. When the computer receives this signal that all "A" registers are full, it transmits a signal called read out "A" registers which is transmitted over a lead 36 to the first channel register "A" gate 38 and the register "A" gates of all of the other 6 channels. If no computer is used lead 34 may be directly connected to lead 36. The register "A" gate 38 has 5 input leads, 39 through 43 inclusive, one from each of the 5 stages of the "A" register 16. A positive condition on any of the leads 39 through 43 represents a 1 bit in its respective stage of the "A" register 16. Upon receipt of the pulse from readout "A" register lead 36, the information is read out to the computer from the register "A" gate broadside on output leads 44 through 48 inclusive, corresponding to leads 39 through 43 inclusive, respectively.

When the 5 stage shift storage register "B" is full, a "B" full lead 50 from information rate change compensator 10 produces a signal which is fed to a 7 way AND circuit 52. The 7 way AND 52 will also get full signals from the "B" full lead 54 of channel 7, and the full leads from the other 5 channels. When all 7 input leads indicate a "B" full condition, the 7 way AND 52 will produce an output on an all "B" register full lead 56, which is transmitted to the computer. The computer returns a read out "B" register signal on a lead 58 which is transmitted to the register "B" gate 60 which is associated with "B" register 18 to gate out the information bits in the "B" registers. At the same time all the other 6 register gates are emptied by the read out "A" register's pulse.

Figure 2A:
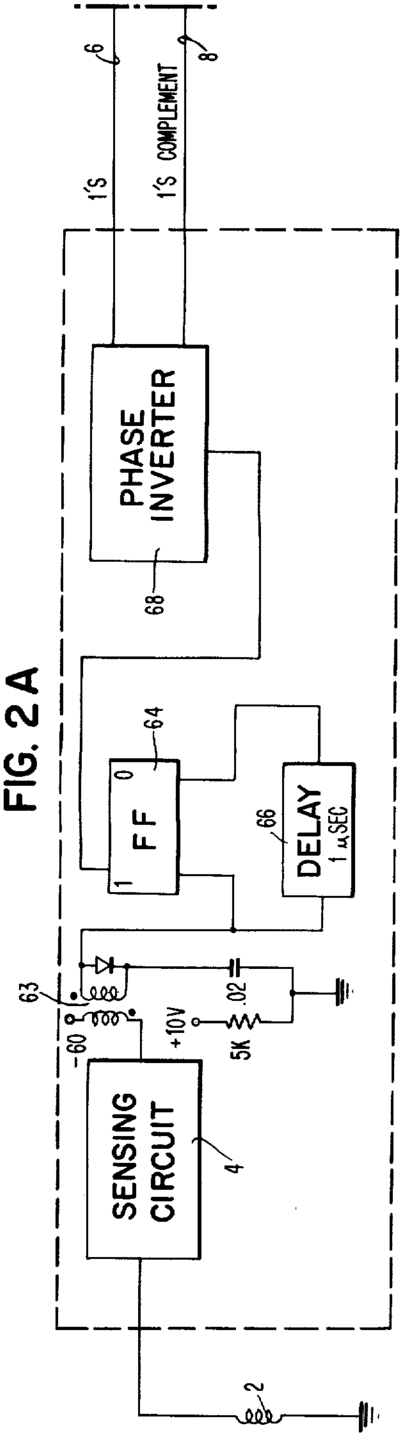
Figure 2B:
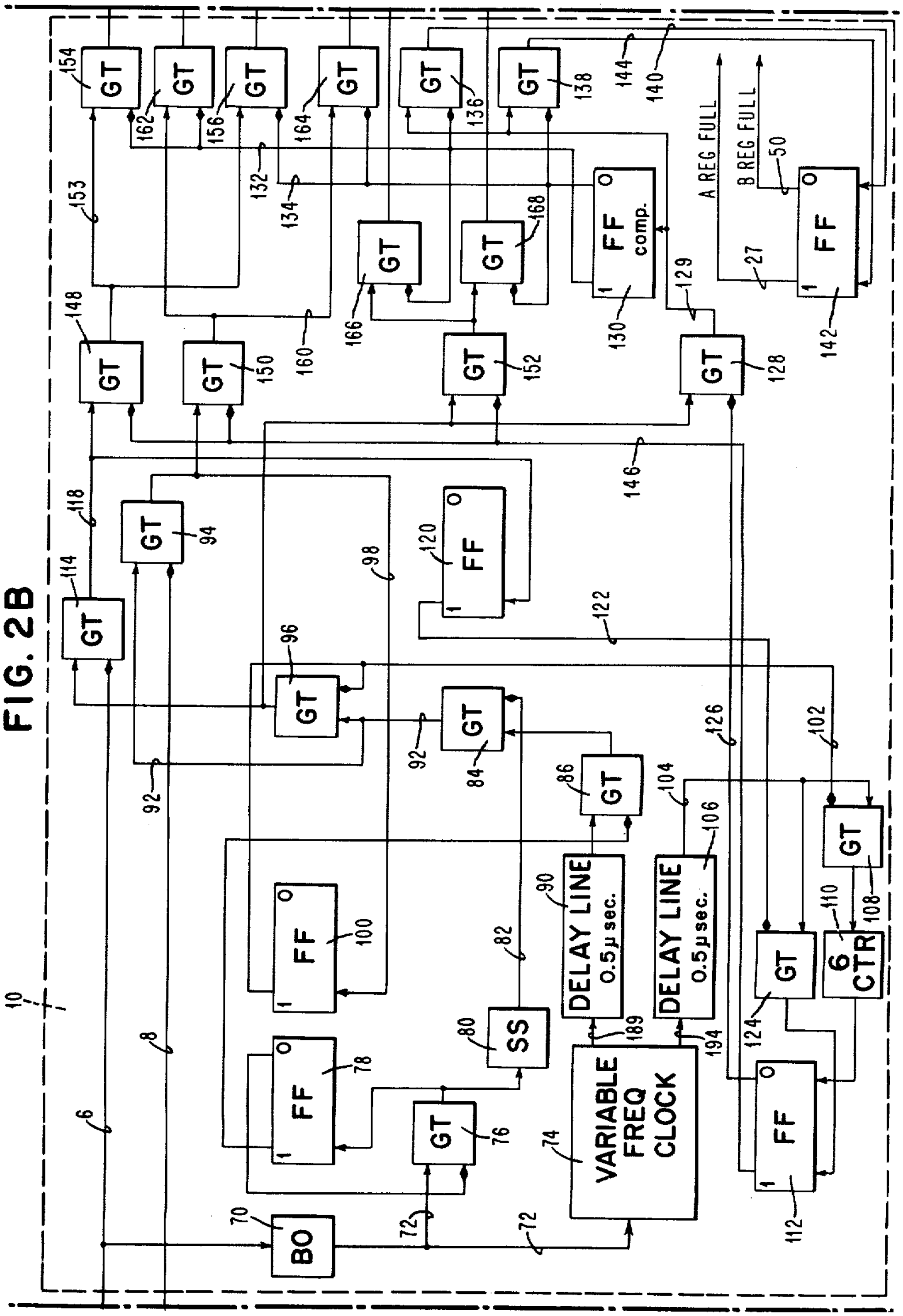
Figure 2C:
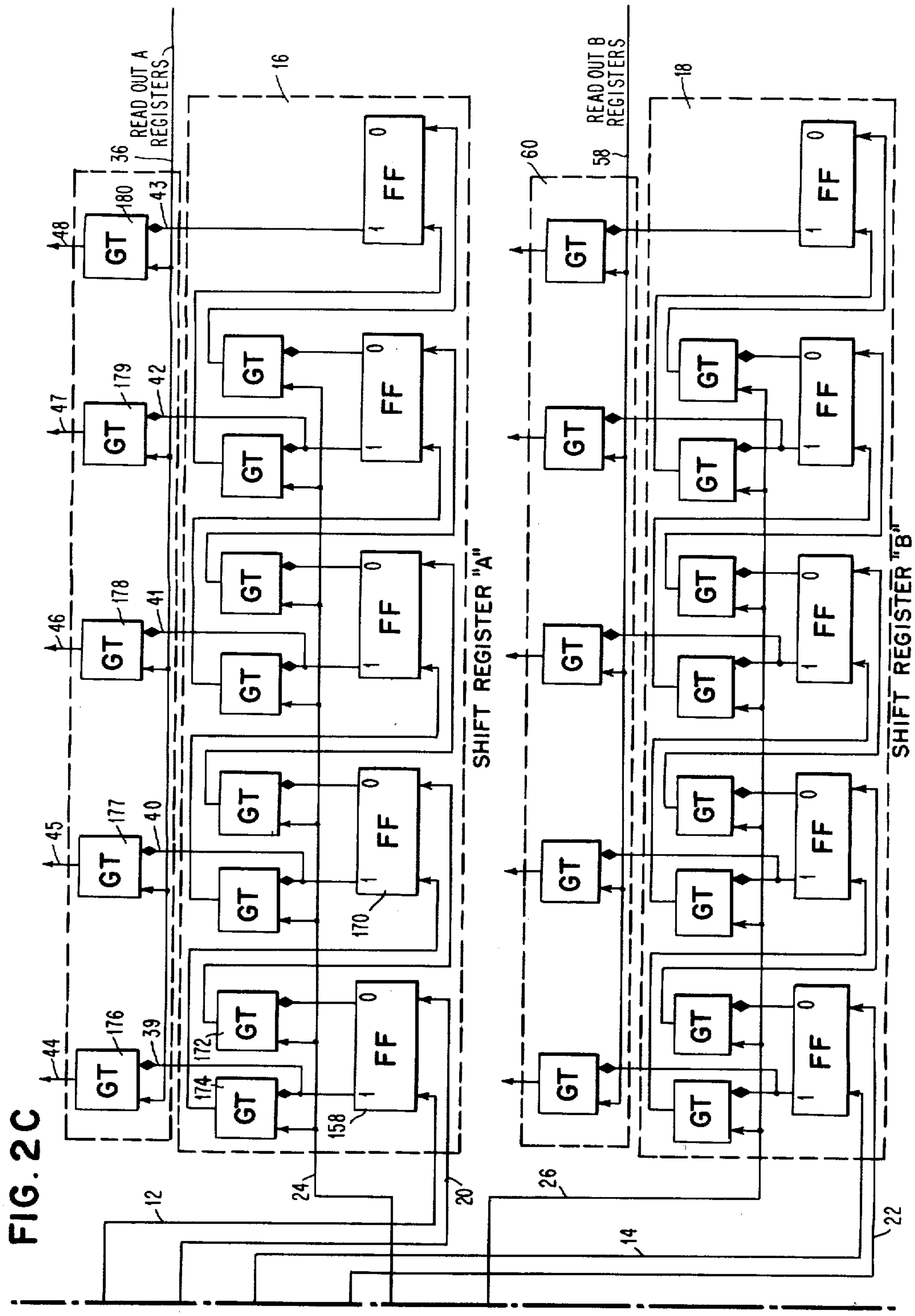

FIGS. 2A, 2B and 2C show a breakdown into logical blocks of the overall functional diagram of FIG. 1. In order to more fully explain the invention, a description will now be given of FIGS. 2A, 2B and 2C in conjunction with the timing chart of FIGS. 5A and 5B.

Figure 7:
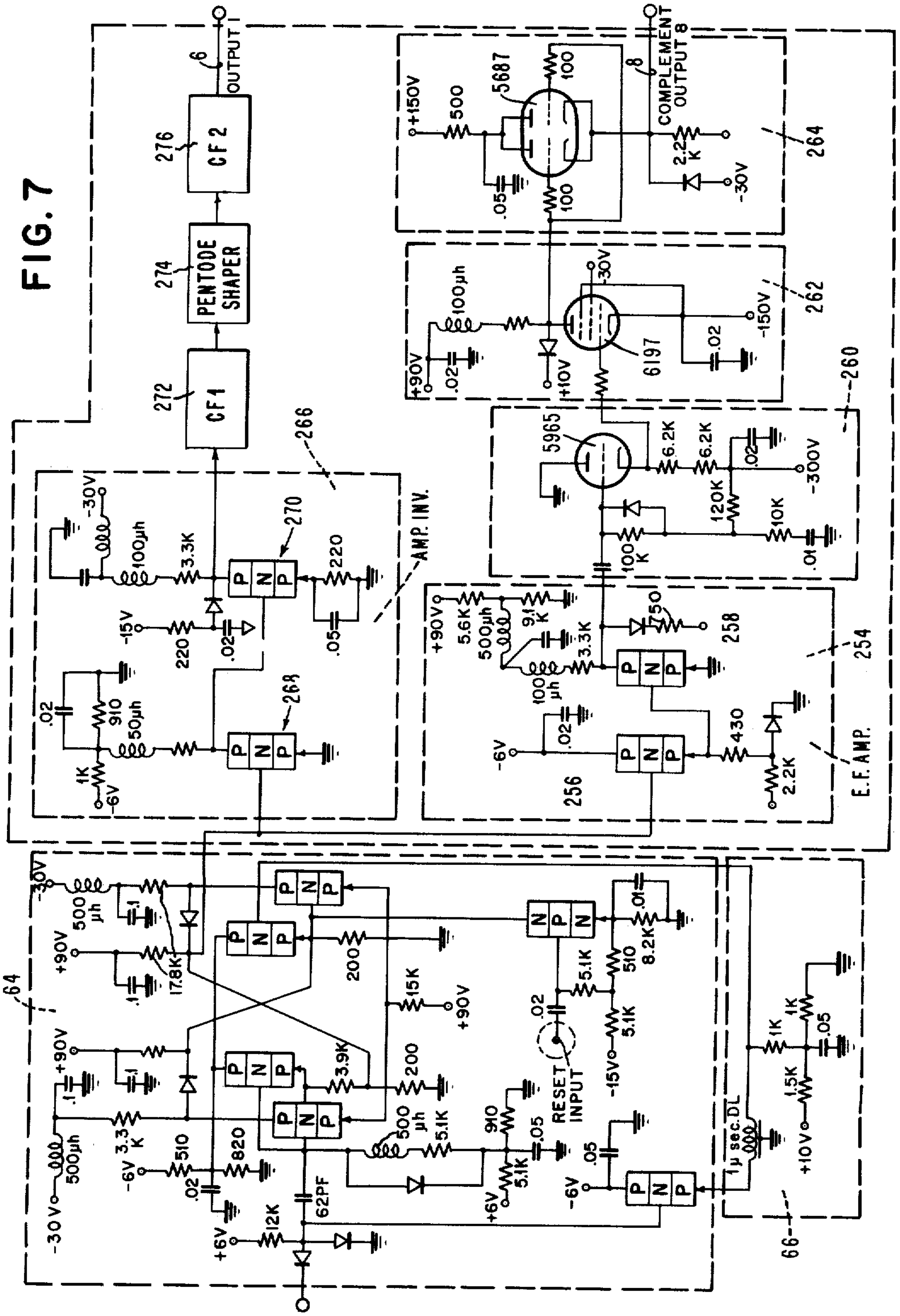
FIG. 7 is a detail circuit diagram of the flip-flop, delay line, and phase inverter shown between the detector and information rate change compensator of the logical block diagram of FIG. 2.

When the magnetic coil (FIG. 2A) senses the information from the tape, this information is in the form of non return to zero (NRZI) signals of the type described in a patent to B. E. Phelps, 2,774,646 issued December 18, 1956. This information is fed to the detector circuit 4 which contains therein a sensing circuit 62. This sensing circuit 62 which must be capable of sensing high density signals, may be of the type described in the patent application on "Apparatus for Translating Magnetically Recorded Binary Data" by L. H. Thompson, Serial Number 704,915, filed December 24, 1957, now Patent No. 3,064,243. The sensing circuit operates to produce a signal like that shown in FIG. 7 of the aforementioned Thompson application, and FIG. 5 of the present application. This positive signal is inverted by a transformer 63 and is fed to the left hand input of a flip-flop 64 and a delay line 66. This flip-flop is one which is reset in advance so that the 1 output side is positive. The negative going signal turns on the flip-flop 64 and also goes through the delay line 66 which provides a fixed delay of one microsecond, after which it is fed to the reset side of the flip-flop 64. Since the original read pulse is about 0.7 microsecond, the output of flip-flop 64 is a wider pulse than that to the input of sensing circuit 62. The use of this wider pulse is utilized to compensate for high frequency jitter in a manner to be more fully described hereinafter. The output from flip-flop 64 is fed to a phase inverter 68 which provides two outputs, one of which is the 1's output which shifts positive when the output of sensing circuit 62 shifts positive, and the other of which is the 1's complement on lead 8 and is 180° out of phase with the 1's output. The details of the flip-flop 64, the delay line 66 and the phase inverter 68 are shown in FIG. 7 and will be described hereinafter. The 1 lead 6 and 1's complement lead 8 feed to the information rate change compensator 10.

A description will now be given of the circuitry of the information rate change compensator 10. This circuit operates to distinguish between the sync pulses and the information pulses. It also contains a variable frequency clock for adjusting the clock pulses to the information rate. At the 3,000 bits per inch density at which the recording of the preferred embodiment of the invention is accomplished, a burst of approximately 16 pulses is required to insure that the variable frequency clock is synchronized with the rate at which the 1 bits are being read from the tape. This synchronizing time is aided by the fact that a burst of 16 1 bits is provided and that there are no 0 bits in the burst to delay the time of synchronizing. It has been found that the use of a single 0 bit is adequate at the densities contemplated for use as an end of burst indication, however, since there is a possibility that in a burst of 16 pulses, one pulse may be missing, it has been found desirable to start looking for this first 0 bit after 13 of the initial synchronization pulses. In this way, there is less likelihood of a dropped "1" bit acting as an end of burst indication.

Figure 5A:
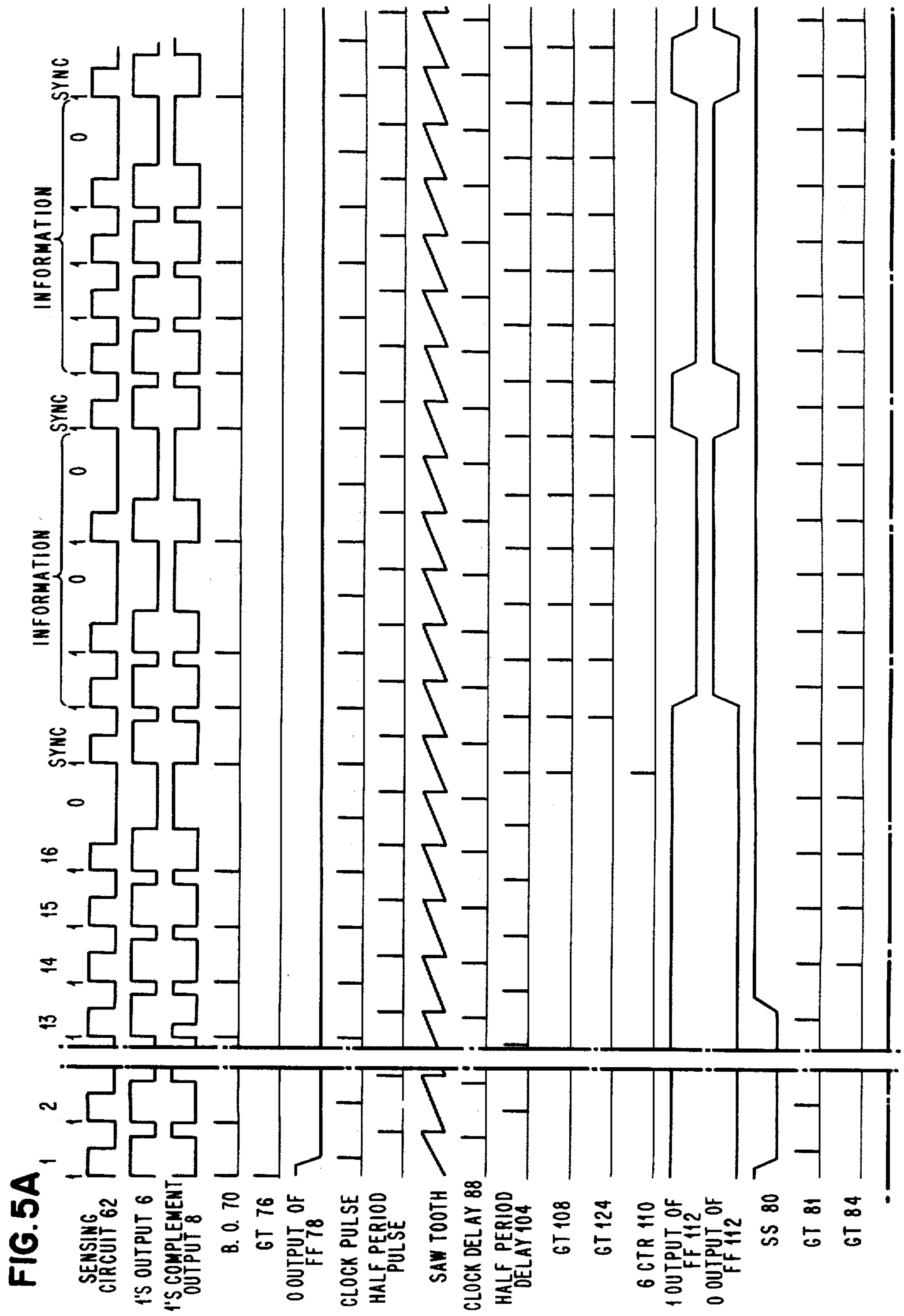
Figure 5B:
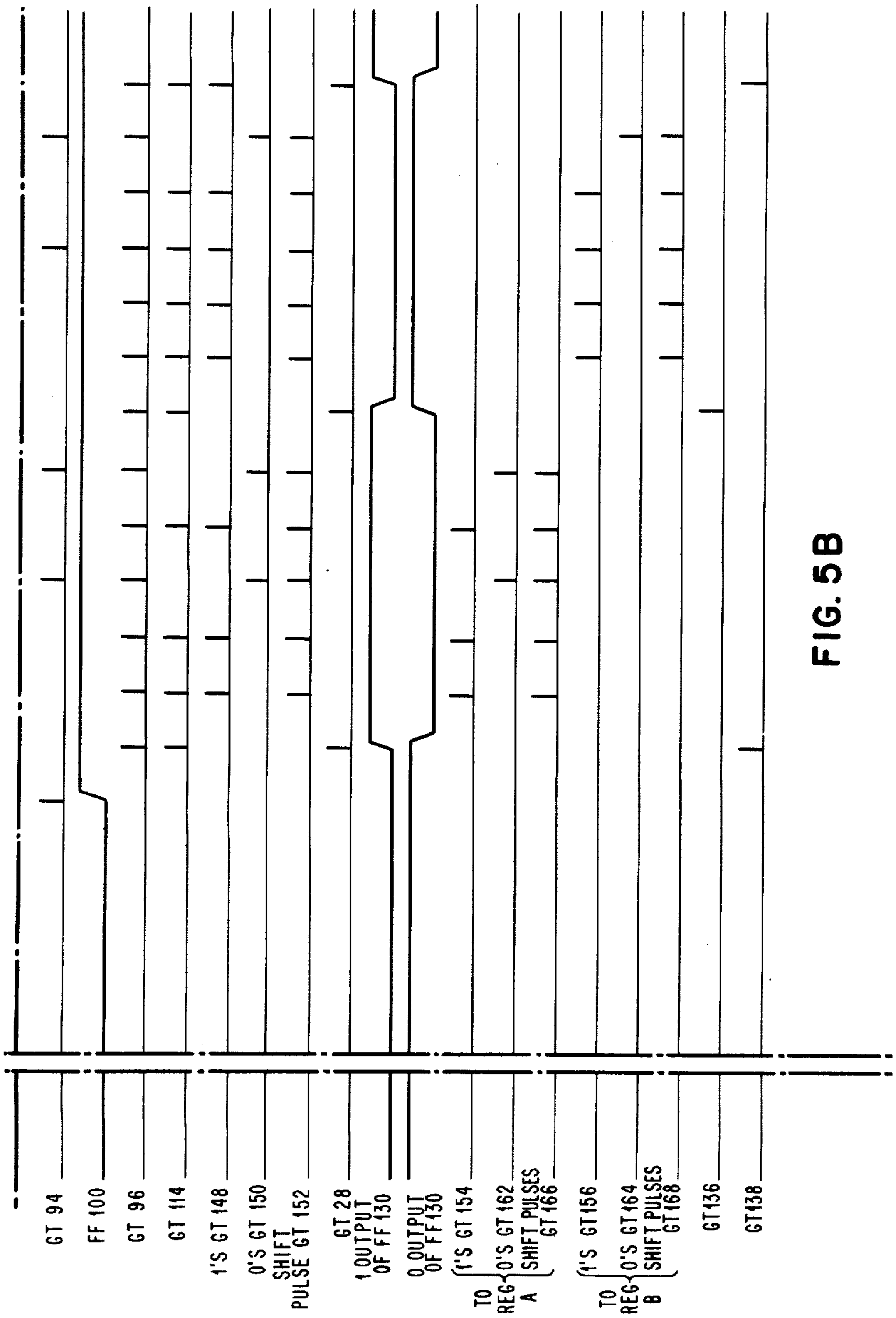

FIGS. 5A and 5B illustrate a record in which the first two sync pulses that come in indicate that the clock is operating too fast, and the clock is brought into synchronism, so that by the 13th sync pulse they are in phase. The description which follows relates to the operation when the clock is in phase with the 1 bits, and thus is illustrated by the waves to the right of the break in FIGS. 5A and 5B. The means for bringing the clock into synchronism will be described thereafter.

Figure 3:
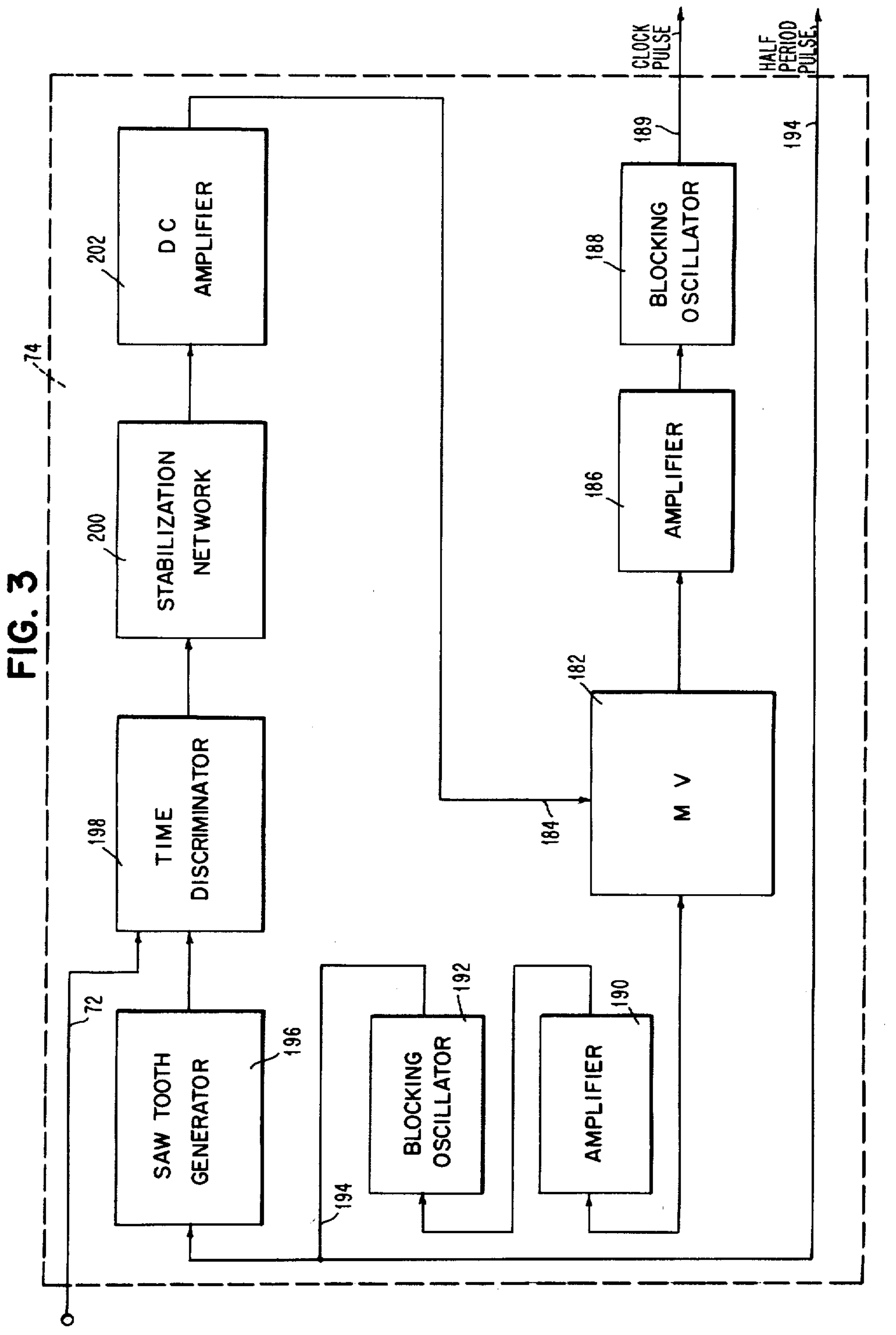

The 1 lead 6 is fed to a blocking oscillator 70, the details of which are like that of the blocking oscillator shown in FIG. 3. The blocking oscillator operates in a well known manner to take a relatively wide positive pulse and produce a very sharp positive pulse at the leading edge. The pulse from the blocking oscillator representative of a 1 bit on the magnetic tape (see FIG. 5A) is fed through a lead 72 to a novel variable frequency clock 74. The variable frequency clock 74 produces clock pulses, and half-period pulses which automatically fall halfway between the clock pulses. The output pulses from the blocking oscillator 70, representative of 1's on lead 72 is also fed to a gate 76. The gate 76 is of the type described in the patent application, Serial Number 414,459 on a "Digital Computer" by B. L. Sarahan et al., filed March 5, 1954, now Patent No. 2,994,778. This gate operates in a manner so that if a D.C. input lead thereto (indicated by a diamond), is positive, a positive pulse on the A.C. input lead (indicated by an arrow) produces a positive pulse on the output lead. The output pulse from gate 76 is fed to the reset side of a flip-flop 78. This flip-flop and every other flip-flop shown in FIGS. 2B and 2C are of the type described in the previously mentioned patent application to B. L. Sarahan et al.

In the operation of this flip-flop, a positive pulse applied to the left hand input terminal produces a high and low D.C. level on output terminals 1 and 0, respectively; a positive pulse applied to a right hand input terminal produces a low and high D.C. level at output terminals 1 and 0.

A positive pulse applied to the complement input terminal (at lower center of block) reverses its existing state and therefore reverses the D.C. level at the output terminals. The flip-flop is normally initially reset so that the 0 output terminal is high. Flip-flop 78 is normally reset so that the 1's output side is positive. Thus the 1's pulse from the blocking oscillator 70 is fed through gate 76 to a single shot multivibrator 80. It is evident then, that after the first pulse has passed through gate 76, the 0's output of flip-flop 78 goes negative and no further pulses are permitted through gate 76. This first pulse passing through gate 76 operates on the single shot 80 to turn it on. This single shot multivibrator is of the type described in the patent application on a "Monostable Multivibrator," Serial Number 474,346 to W. L. Jackman, filed on December 10, 1954, now Patent No. 2,954,528. The single shot multivibrator operates so that when a positive pulse is fed thereto, it will remain in an ON condition for a predetermined length of time. Single shot multivibrator 80 remains on for 18 microseconds. Since the output is tied to the "1" output side of a single shot, this output lead 82 will be negative for 18 microseconds as shown in FIG. 5, or the time for 13 clock pulses. After the 13th clock pulse the circuit will look for 0 bits.

The output lead 82 is fed to the D.C. input lead of a gate 84. The 0's output lead of flip-flop 78 is connected to the D.C. input lead of gate 86. The A.C. input lead to gate 86 is a clock pulse delay lead 88 which comes from a delay network 90, which in turn is connected to the clock pulses output of the variable frequency clock 74. The fixed delay 90 is one of 0.5 microsecond and is used as part of the high frequency jitter circuit in a manner to be presently described. After the first pulse, clock pulses from lead 88 will thus be gated through gate 86 because the 1 output lead of flip-flop 78 will be positive. The output pulse from gate 86 will be gated through gate 84 after the 13th pulse of the initial synchronizing burst. The 14th pulse from gate 86 will pass through gate 84 because lead 82 from single shot multivibrator 80 will then go positive. Each clock pulse will then be fed to an A.C. input lead 92 of gates 94 and 96. The D.C. input lead of gate 94 is the 1's complement lead 8. The first time after the 13th pulse that a "0" pulse is present on the tape, the 1's complement lead will be positive when the delay clock pulse is produced. Thus a pulse at the output of gate 94 on a lead 98 representative of a "0" is fed to a flip-flop 100. The flip-flop 100 is thus turned on after the first "0" is detected and its output lead 102 goes positive as an indication that the first "0" bit after the initial synchronizing burst is detected. Lead 102 is the D.C. input of a gate G8, the A.C. input of which is a delayed half-period pulse lead 104. The half-period pulses from variable frequency clock 74 are fed through a delay 106 which is preset to have exactly the same delay as delay 90 which delays the clock pulses. The half-period pulses on lead 104 are thus passed through a gate 108 after the first "0" is detected.

Figure 8:
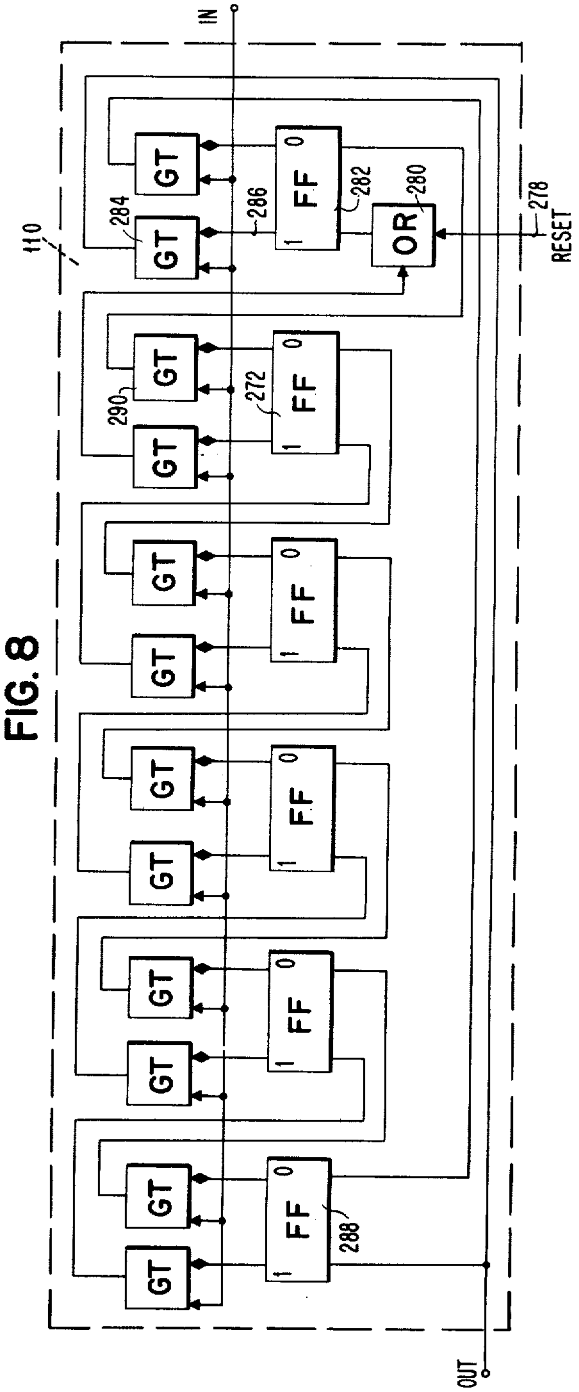
FIG. 8 is a block diagram of the counter of FIG. 2B.

The pulse which passes through the gate 108 will feed to a six counter 110. The counter 110 is of the type which produces a positive output pulse on every 6th input pulse. The details of this type of counter are shown in FIG. 8, which will be described hereinafter. The counter 110 is preset so that the first pulse to the counter will pass through it and attempt to turn off a flip-flop 112. Since this flip-flop 112 is already off, it will have no effect. The off condition of the flip-flop 112 signifies a synch pulse and the on condition signifies an information pulse. This first pulse after the first "0" is always a sync pulse. The next five pulses are information pulses.

Lead 102 from the flip-flop 100, which turns on after the first "0" is detected, also is connected to the D.C. input of gate 96 to condition it. Thus, from this point of the clock pulses may pass through gate 96.

The first clock pulse after the first "0" will thus be passed by gates 86, 84 and 96 so that it reaches the gate 94 and a gate 114 through a lead 116. Gate 114 has its D.C. input connected to the 1's lead 6, and gate 94 has its D.C. input connected to the 1's complement lead 8. Since all clock pulses will now reach the gates 94 and 114, one gate or the other will produce an output depending on whether the 1's lead 6 or the 1's complement lead 8 is high. If the 1's lead 6 is high, the gate 114 will produce an output on lead 118 representative of "1." If the 1's complement lead 8 is high, the gate 94 will produce an output on lead 98 representative of a "0." The clock pulse following the first "0" will thus pass through gate 114 and lead 118 to turn on a flip-flop 120. When flip-flop 120 goes on, its 1 output lead 122 becomes positive to condition the D.C. input of gate 124, the output of which is connected to the left hand input side of flip-flop 112. A flip-flop 112 thus is in the off condition to signify a sync pulse and in the on condition to signify an information pulse. The 6 counter 110 will produce an output pulse for every 6 input pulses, which pulse will turn flip-flop 112 off. The first bit after the 0 pulse therefore should provide a carry from the 6 counter 110 to place the flip-flop 112 in the off condition. Therefore, the 6 counter 110 is reset so that the first pulse after the first 0 will provide a carry, indicative of the sync pulse, after which there will be a carry only after 6 pulses. The flip-flop 112 is turned on from gate 124 since gate 124 is conditioned after the first sync pulse. From then on, every half-period delay pulse on lead 104 will pass through gate 124 to hit the left hand input of flip-flop 112. This pulse will thus turn on flip-flop 112 on the first information bit after the sync bit. When the time for the next sync pulse comes along, gate 124 will produce an output, but at the same time the 6 counter 110 will produce an output (see FIG. 5A). When the two input pulses hit flip-flop 112, a well known type of complementing action takes place and flip-flop 112 will turn off to indicate a sync pulse condition.

*Flip-flop* 112 which is utilized to distinguish between sync pulses and information pulses, will remain in the on condition to condition gates which pass the information bits to the shift registers and is also used to provide the shift pulses for the shift registers, all in a manner to be presently described. Each time flip-flop 112 is turned off, a signal is produced which transfers the flow of information from the information rate change compensator 10 alternately to the "A" register and "B" register. As has been previously described, when the first "0" is detected, the next half-period delay pulse from the variable frequency clock is fed through gate 108 to the counter 110 to produce an output pulse.

The 0 output lead 126 of flip-flop 112 is connected to the D.C. input of gate 128, the A.C. input of which is the delayed clock pulse lead 116. When the flip-flop 112 is off, lead 126 is positive and the next clock passes through gate 128 and a lead 129 to the complementary input of a flip-flop 130. Each pulse to the complementary input of flip-flop 130 turns the flip-flop from its previous condition to the opposite condition in a manner described in the aforementioned Sarahan et al. application. The 0 output lead of flip-flop 130 is the "A" lead 132, and the 1 output is the "B" lead 134. Thus, when the "A" lead 132 is positive, information will be transmitted to the "A" shift register 16, while when the "B" lead 134 is positive, the information is transmitted to the "B" shift register 18.

The clock pulse on lead 129 from gate 128 is also connected to the A.C. input of gates 136 and 138. The D.C. input of gate 136 is connected to the "A" lead 132. Thus, when the clock pulse on lead 129 arrives, it passes through gate 136 before flip-flop 130 has time to flip and an output is produced on a lead 140 which is connected to the right hand input of a flip-flop 142. This pulse will attempt to turn the flip-flop 142 OFF to indicate that the "B" registers are full. When the next sync pulse comes along, this will be an indication that the "A" registers are full. The D.C. input of gate 138 is connected to the "B" lead 134. Thus, when the next clock on lead 129 arrives, it passes through gate 138 and an output is produced on a lead 144 to turn ON flip-flop 142 and indicate that the "A" register is full.

When flip-flop 112 is ON to indicate information pulses, its 1 output lead 146 which is connected to the D.C. inputs of gates 148, 150 and 152 is high. Therefore, a clock delay pulse from gate 114 indicative of a 1 bit will pass through gate 148 to a lead 153 to a pair of gates 154 and 156. Gate 154 has its D.C. input connected to "A" lead 132, while gate 156 has its D.C. input lead connected to "B" lead 134. If the "A" lead is high, the pulse on lead 153 representative of a "1" will pass through gate 154 to the left hand input of the first stage flip-flop 158 of the shift register "A" 16 (FIG. 2C). A clock delay pulse from gate 94 on lead 98 representative of a "0" will go to the A.C. input of gate 150, and since it is conditioned by lead 146, will pass through to a lead 160 to a pair of gates 162 and 164. Gate 162 has its D.C. input connected to "A" lead 132 and so if there is a "0" bit coming in, a pulse will pass through gate 162 to the right hand input of flip-flop 158 in the "A" shift register 16. It is obvious that since gates 156 and 164 have their D.C. inputs connected to the "B" lead 134 that these two gates are used in a manner similar to gates 154 and 162 except that they enter 1 and 0 bits respectively into the "B" shift register 18 (FIG. 2C).

Gate 152, which also has its D.C. input connected to lead 146, has its A.C. input lead connected to gate 96 so that a clock delay pulse passes through the gate 152 to the A.C. input of a pair of gates 166 and 168. Gate 166 has its D.C. input connected to the "A" lead 132 so the clock delay pulse passes through gate 166 to the shift pulses "A" lead 24 which shifts the "A" shift register 16. This shift pulse actually takes place at approximately the same time that the information bits are fed to the shift register. However, they act to shift the information in the stages to the succeeding stages before the flip-flops are operated because there is an inherent delay in the flip-flops. Shift register 16 operates in a well known manner and just a brief description will be given as to how information may shift from the first stage flip-flop 158 to a second stage flip-flop 170 and the rest of the operation will be obvious therefrom.

When flip-flop 158 has a "0" bit stored therein, its "0" output lead is high and a gate 172 is conditioned by its D.C. input lead. If a "1" bit is stored in flip-flop 158, a gate 174 will have its D.C. input high. Thus, when the shift pulse 24 which is connected to the A.C. input of both gates 172 and 174 arrives, only the gate which has its D.C. input high will produce an output pulse. Thus, if the 1 output lead is high, the gate 174 will produce an output pulse which is fed to the left hand output of flip-flop 170 to turn it ON and indicate a 1 bit.

When the five information bits are in the five flip-flops of the "A" shift register 16, a pulse on the read-out "A" registers lead 36 gets fed to the A.C. input of gates 176 through 180 inclusive. Since each of the gates 176 through 180 has its D.C. input connected to the 1 output of the flip-flops in the "A" shift register 16, read-out pulse will produce a pulse representative of 1 bits on the gates 176 through 180 which are conditioned.

To produce clock pulses for gating and other timing, a variable frequency clock is used, which comprises a multivibrator that produces square wave pulses. A control of its frequency is obtained by variations in the screen voltage of the multivibrator. The multivibrator pulses initiate a saw tooth wave which is combined in a time discriminator with 1 pulses coming from the tape. Each 1 pulse should all in the center of the saw tooth wave. If it begins to fall before the center of the saw tooth wave, it is an indication that the pulses are coming earlier, i.e., that the tape is beginning to speed up. The time discriminator then signals the multivibrator to increase its frequency. Conversely, if the 1 pulses begin to fall after the center of the saw tooth, the time discriminator signals the multivibrator to decrease its frequency.

In FIG. 3, a multivibrator 182 is of the standard type which is ordinarily connected so that its lead 184 is a constant voltage source to keep the frequency at an average value. The multivibrator operates so that an increase in voltage on lead 184 will cause an increase of frequency in the multivibrator 182 and a decrease in voltage causing a decrease in frequency. A multivibrator is a device which produces a square wave output on each of its output terminals, its left hand output being 180° out of phase with its right hand output. The right hand output from the multivibrator 182 is fed via an amplifier 186 to a blocking oscillator 188. The blocking oscillator produces a sharp positive pulse on a clock pulse 189 at a time coincident with the rise in voltage of the right hand output square wave. The output of the blocking oscillator is therefore a sharp positive pulse hereinbefore described as the clock pulse. The left hand output of multivibrator 182 is fed through an amplifier 190 and a blocking oscillator 192 to a half-period pulse lead 194 which therefore falls halfway between the clock pulses. The half-period pulse lead 194 is fed to a saw tooth generator 196 in which each half-period pulse starts the rise of a saw tooth wave. The saw tooth wave is fed to one input of a time discriminator 198, the other input of which is the lead 72 which, as previously described, carries sharp positive pulses representative of 1 bits on the tape.

Ordinarily a 1 bit on lead 72 falls in time at the center of the saw tooth wave. If this condition continues, the output of the time discriminator, which is at an average D.C. value, remains unchanged. This unchanged average D.C. value is fed through a stabilizing network 200 and a D.C. amplifier 202, the output of which is also the unchanged average D.C. value on lead 184 which controls the frequency of the multivibrator 182. Since the value of the D.C. voltage on lead 184 and the condition in the situation being described is unchanged, the frequency of multivibrator 182 remains unchanged.

Figure 6A:
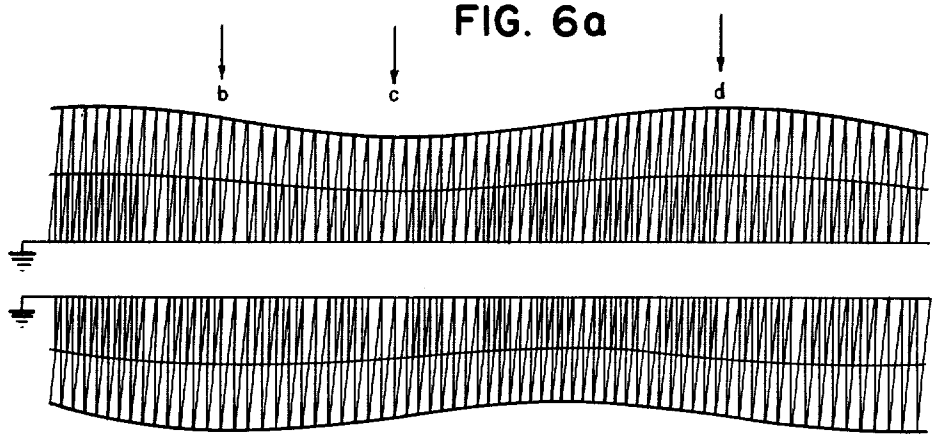
FIGS. 6A, 6B, 6C, 6D, 6E and 6F are timing diagrams illustrating the operation of the variable frequency clock.
Figures 6B, 6C, 6D:
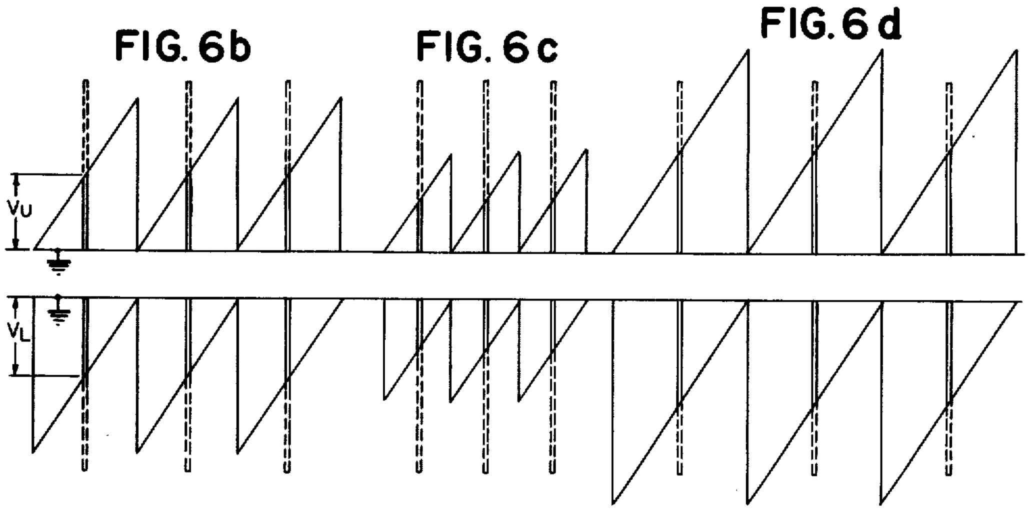

FIG. 6*b* illustrates the saw tooth wave and the 1 bits coming at the average frequency so that the 1 bits fall in the center of the saw tooth wave.

When the frequency at which the 1 bits arise has increased, the 1 bits will be displaced to the left with respect to the center of the saw tooth wave (see FIG. 6*e*), it is then necessary to increase the frequency of multivibrator 182. This is accomplished within the time discriminator 198, wherein the voltage at the output of the time discriminator 198 decreases. This will cause the voltage at the output of the D.C. amplifier 202 to increase the frequency of multivibrator 182. The increase in frequency means that the half-period clock pulses on lead 194 start coming at a faster rate. Thus, the saw tooth generator produces saw tooth waves of shorter time duration and narrower width. At the point where the 1 bits once again fall in the center of the narrowed saw tooth wave as in FIG. 6*c*, the frequency of the multivibrator stops changing at its new increased frequency.

Figure 6E:
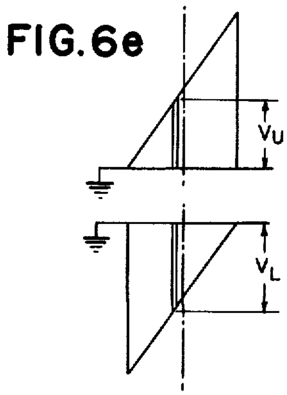
Figure 6F:
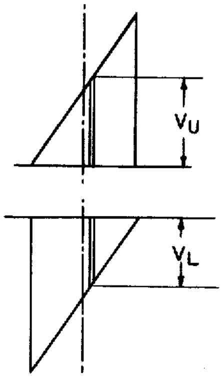

FIG. 6*f* is an example of 1 bits starting to come at a slower rate than the multivibrator frequency and therefore the 1 bits are shifted slightly to the right of the center of the saw tooth wave. This condition is recognized by the time discriminator 198 which produces an increased voltage at the output of D.C. amplifier 202 on the lead 184 to decrease the frequency of multivibrator 182. The decreased multivibrator frequency causes an increased spread in the half period pulses on lead 194 which produces wider saw tooth waves. When the 1 bits on lead 172 finally fall in the center of the increased width saw tooth wave, as shown in FIG. 6*d*, the multivibrator frequency stops changing at its new decreased frequency.

Figure 4A:
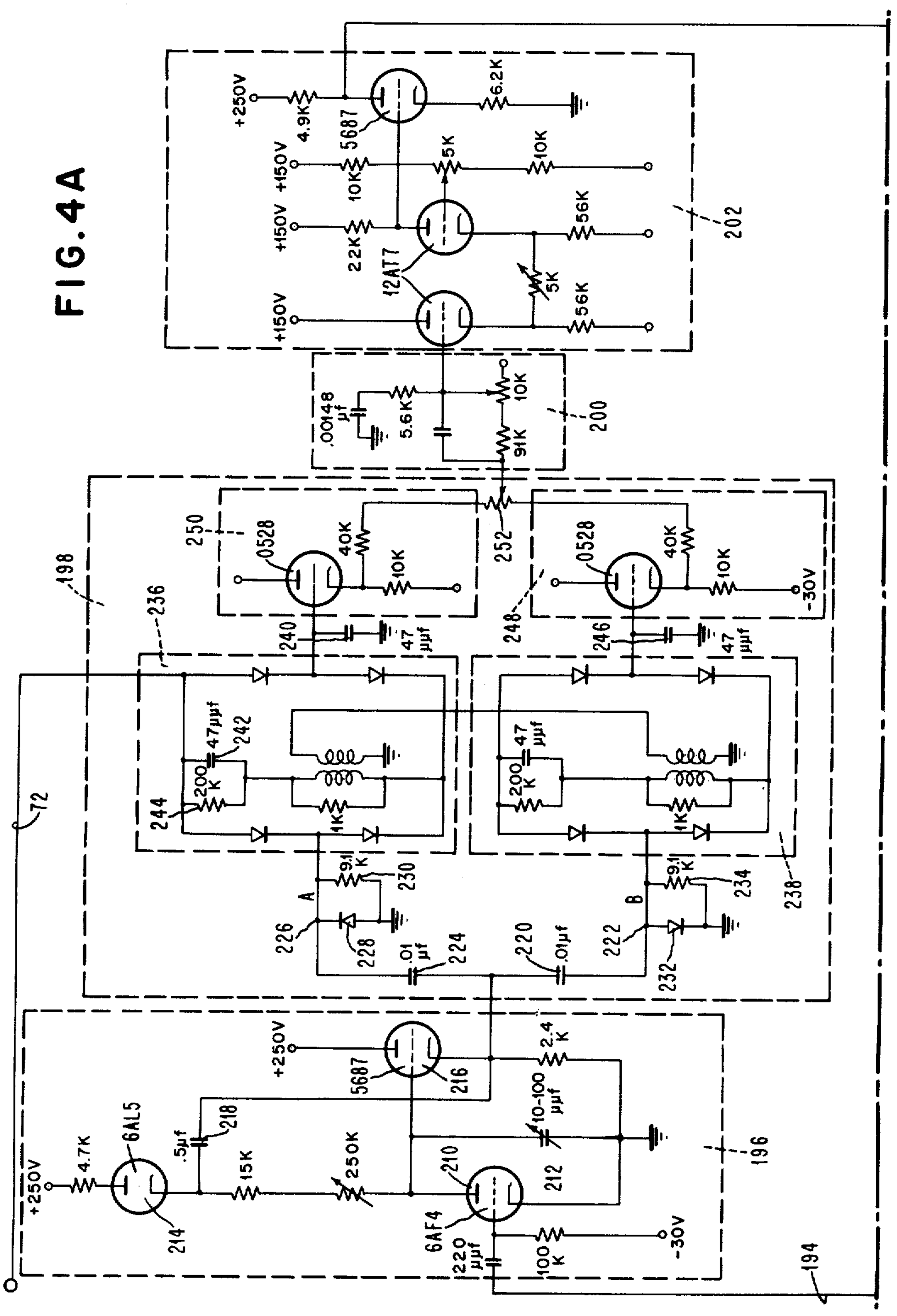
Figure 4B:
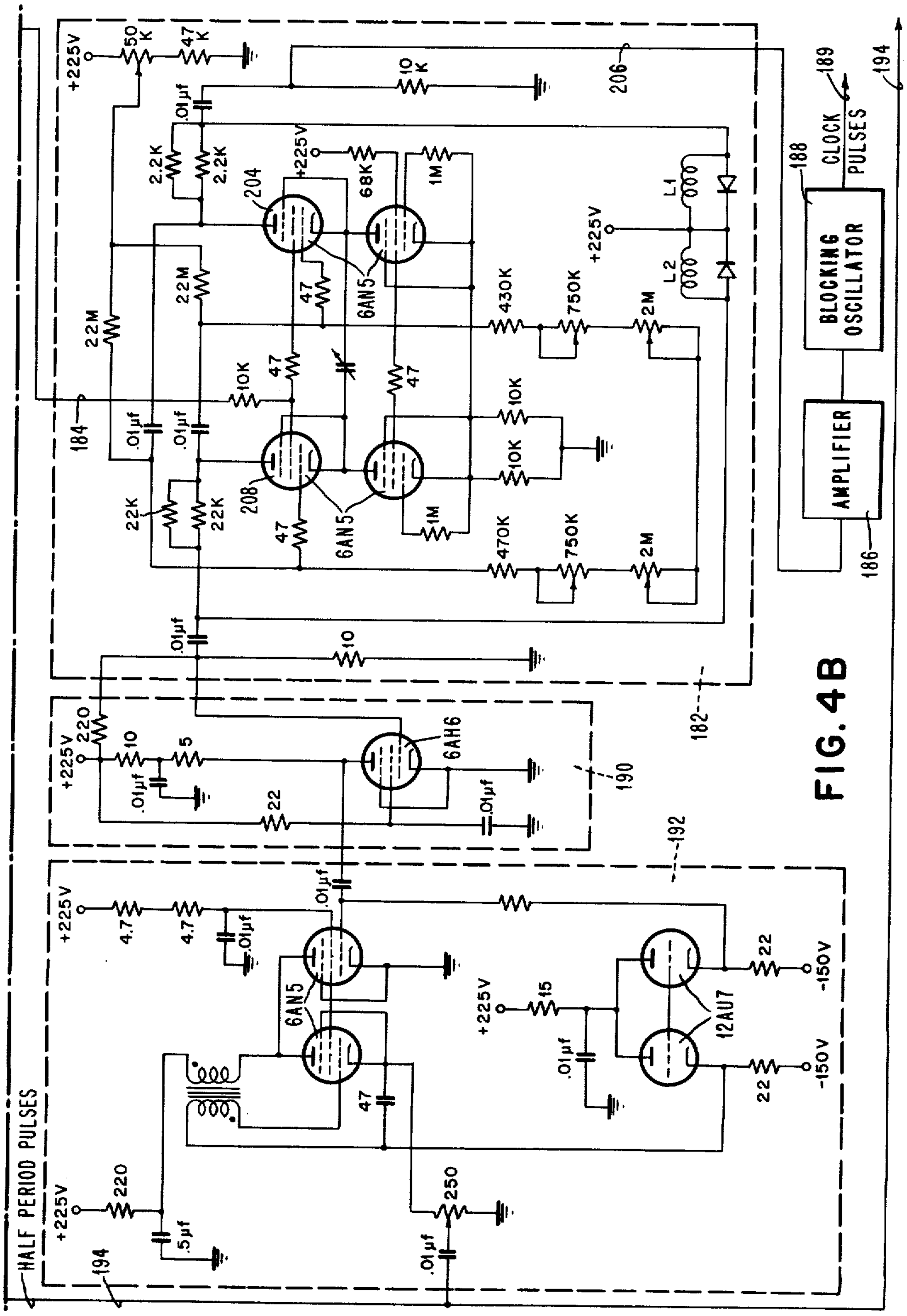

FIGS. 4A and 4B show the details of the block diagram of FIG. 3. The multivibrator 182 (FIG. 4B) has a tube 204, the plate of which provides clock pulses on the lead 189 via lead 206, the amplifier 186 and the blocking oscillator 188. Half-period pulses taken from the plate of a tube 208 of the multivibrator 182 are fed via the amplifier 190 and the blocking oscillator 192 to the half-period pulse lead 194.

The details of amplifier 190 are shown in FIG. 4B and since amplifiers of this type are well known in the art, no further description will be given. The amplifier 186 is a similar type amplifier. Blocking oscillator 192 is shown in detail in FIG. 4B and since it too is of a type well known in the art, no further description will be given. Blocking oscillator 188 is the same type of oscillator as blocking oscillator 192.

Half-period pulses on lead 194 appear at the grid of a tube 210 of the saw tooth generator 196. A condenser 212 will be discharged when tube 210 conducts. It will charge again through a tube 214 and the charging rate is linear due to feed back from the cathode of a tube 216 through a condenser 218 to the cathode of the tube 214. When condenser 212 starts to charge, the grid of tube 216 is at ground potential. As condenser 212 charges, the grid of tube 216 rises in voltage, which also causes its cathode to rise. This risiing voltage is transmitted to the cathode of tube 214 and the effect of this is to make the charging rate of condenser 212 substantially linear. At some point during the charging of condenser 212 and before it is fully charged, the next half-period pulse appears on the grid of the tube 210 causing condenser 212 to discharge. The result of this action is a saw tooth wave at the cathode of tube 216.

The saw tooth wave is transmitted through a condenser 220 to a point 222 and also through a condenser 224 to a point 226. At point 222, the top of the saw tooth wave is clamped to ground and at point 226, the bottom of the saw tooth wave is clamped to ground by a diode 228 and a resistor 230. The resistor 230 is needed in order to insure that one side of the condenser 224 goes to ground potential at the fall of the saw tooth pulse. A diode 232 and a resistor 234 perform a similar function in clamping the top of the saw tooth wave to ground at point 222.

FIGS. 6*a* through 6*f* indicate two sets of saw tooth waves. In each of these figures, the upper wave has its bottom clamped to ground and the lower wave has its top clamped to ground. The use of the two saw tooth waves performs a balancing function which compensates for any non linearity that remains in the saw tooth wave and any variations in the saw tooth voltage. Point 226 is connected to a bi-directional switch 236, and point 222 is connected to a bi-directional switch 238. Bi-directional switches of this type are described in a book entitled, "Wave Forms," volume 19 of the Radiation Lab Series.

Only the effect of these bi-directional switches 236 and 238 will be described, and their use can be understood by reference to FIGS. 6*a* through 6*f*. Referring to FIG. 6*b*, the condition is shown in which the frequency of the information pulses as received from the tape agrees with the frequency of the saw tooth wave. The bi-directional switch 236 samples a short portion of the information pulse and the saw tooth wave, the bottom of which is clamped to ground. The output of switch 236 is a voltage $V_U$ which is applied to a condenser 240 (FIG. 4A). It should be pointed out that the output of switch 236 is not a series of voltage pulses obtained by sampling the saw tooth wave but is rather a continuous voltage, the value of which is continuously adjusted. This property of switch 236 is obtained by a condenser 242, resistance 244 and the condenser 240, which try to maintain the output voltage of switch 236 at a value determined by the last comparison made between an information pulse and the saw tooth wave. This feature may be known as "frequency memory," the purpose of which is to maintain the voltage $V_U$, during 0 bits while there is a drop out of information pulses from the tape.

The lower portion of FIG. 6*b* shows that the bi-directional switch 238 samples the saw tooth wave, the top of which is clamped to ground to produce a voltage $V_L$ which, in the case where the frequency of the information pulses agrees with the frequency of the clock, is equal to $V_U$ but of opposite polarity. Thus, the voltage transmitted to a condenser 246 (FIG. 4A) will be the same value but of opposite polarity as the voltage on condenser 240. A cathode follower 248 will thus conduct in a manner which keeps its cathode a certain voltage below ground while a cathode follower 250 will conduct in a fashion to keep its cathode the same voltage above ground. With these conditions, the mid-point of a resistor 252 connected between the cathode followers 248 and 250 will be at ground potential, and thus ground potential will be applied to the input of the D.C. amplifier 202 through the stabilizing network 200. The output of the D.C. amplifier 202 which appears on lead 184 will thus be at its average value and consequently the frequency of the multivibrator will be at its average value. The stabilizing network 200 comprises a low pass filter, the purpose of which is to make the variable frequency clock insensitive to phase jitter, phase jitter being compensated in another part of the circuit.

Referring to FIG. 6*e*, it can be seen how an increase in tape speed will cause a corresponding increase in frequency of the clock. The bi-directional switches 236 and 238 no longer sample the saw tooth wave at its mid-point, but to the left of the mid-point, thus causing $V_L$ to become greater than $V_U$. The effect of this is to increase the voltage on the mid-point of resistor 242 (FIG. 4A) to some value below ground. This will cause the voltage output of amplifier 212 to increase, as hereinbefore mentioned. An increase in voltage on lead 184 will cause an increase in frequency of multivibrator 182 until the condition of FIG. 6*c* is reached.

FIG. 6*f* shows how, in the case of a decrease in tape speed, the voltage $V_U$ becomes greater than $V_L$. This results in a raising of potential on the mid-point of resistor 252 (FIG. 4A) to some value above ground. This in turn causes the voltage of lead 184 to decrease, causing a decrease in the frequency of multivibrator 182.

During the course of the description the details of some of the circuitry has been referred to but not fully described. This circuitry is shown in FIGS. 7 and 8, which will now be briefly described.

In FIG. 7, the flip-flop 64 is shown as a transistor flip-flop which acts in a well known manner to switch on negative input pulses and therefore no further description of its operation is necessary.

The details of the delay line shown in FIG. 7 indicate that it too is a well known type of delay line with the values of the components chosen so that it delays the pulses 1 microsecond at the frequency.

The phase inverter 68, the details of which are also shown in FIG. 7 operates so that a negative pulse at its input lead becomes a positive pulse at the 1's output lead 6, and a negative pulse at the 1's complement output lead 8. Between the input lead to the phase inverter and output lead 8 there is an emitter follower amplifier 254 made up of a well known type of transistor emitter follower stage 256 followed by a well known type of transistor amplifier stage 258. Since the emitter follower does not invert the polarity of an input signal but the amplifier does, the pulse at the output of emitter follower amplifier 254 is of opposite polarity to the input pulse. This pulse is fed to a well known type of vacuum tube cathode follower 260 for power considerations and then to a well known type of pentode shaper 262 which operates to improve the rise time of the pulse. The pentode shaper also inverts the pulse so that it is back at the original polarity. The pulse is then fed to another well known type of cathode follower 264 which does invert the pulse. Thus the pulse on output lead 8 is of the same polarity as that coming from flip-flop 64. The pulse from flip-flop 64 is also fed through an amplifier inverter 266 which consists of a well known type of transistor amplifier 268 followed by a well known type of transistor inverter 270. The input signal is inverted by amplifier 268 and reinverted by inverter 270. The pulse is then fed through a cathode follower 272, a pentode shaper 274, and a cathode follower 276 which are similar to cathode follower 260, pentode shaper 262, and cathode follower 264, respectively. Of the three units, only the pentode shaper 274 inverts the signal and so a signal on output lead 6 is the inverted signal of that fed into amplifier inverter 266. Therefore, the pulse on lead 8 is 180° out of phase with the pulse on lead 6.

FIG. 6*a* shows that the speed of the tape drive, which may be represented by the envelope which follows the top of the pulse line at roughly the center of the saw tooth, varies slowly over a number of saw tooth waves so that the change in amplitude and width of the saw tooth is slow as compared to a single saw tooth width. The letters *b*, *c*, and *d* are placed to show the relative position that the saw tooth waves of FIGS. 6*b*, 6*c* and 6*d* respectively were taken.

Now that the details of the variable frequency clock has been described, the compensation for high frequency jitter can be understood. Jitter is the high frequency variations between pulses in a single track, i.e., the pulses may come earlier or later than the ideal location for the pulse at any speed of tape drive. This jitter may take place in spite of the fact that the average frequency at which the pulses are coming remains the same. In the description of jitter which follows, it will be assumed that the average frequency remains the same and that therefore the width of the saw tooth waves for a succession of read pulses, is the same.

It is observed in FIG. 2B that the half-period delay pulse is used to gate out of gates 86 and therefore gates 114 and 94, and that this is a very sharp pulse because it comes from the blocking oscillator 188 of FIG. 3.

The half period pulse starts the saw tooth wave. Therefore, the clock pulse which inherently falls between the half-period pulses falls in the center of saw tooth wave. The output of blocking oscillator 70 of FIG. 2B, which occurs at the beginning of the read pulse, is therefore maintained in the center of the saw tooth wave. The read pulse itself is broadened to a fixed width by producing a fixed clock delay which is half the width of the broad read pulse and it is known that the clock delay will fall very nearly in the center of the broadened read pulse. The broadened pulse is selected so that it is always narrower than the least possible distance between read pulses which may be caused by variations in the speed of the tape drive. Therefore, the distance between pulses can vary (jitter) to the point where a read pulse can come, in time, one half the broadened pulse width in either direction from the point at which it would ideally come at a constant speed tape drive.

The 6 counter 110 of FIG. 2B is shown in greater detail in FIG. 8. A reset lead 278 is fed through an OR circuit 280 to the left hand input of the sixth flip flop 282 of the counter 110. Thus, right after reset, a gate 284 which is connected to the 1's output side of flip-flop 282 has its D.C. input lead 286 positive.

When the first half period delay pulse arrives on the input lead which is connected to the A.C. input of all the gates of counter 110, gate 284 will produce an output pulse on the output lead of counter 110 (left hand side of FIG. 8). In this manner the first pulse to the 6 counter 110 produces an output pulse. This output pulse also is connected to the left hand input of the first flip-flop 288 turning it on. Simultaneously, the half period delay pulse passes through a 5th stage gate 290 which is conditioned because the 5th stage flip-flop 292 is off. The output pulse from gate 290 is transmitted to the right hand input of flip-flop 282 turning it off. From this point on each flip-flop stage turns on and off in a similar manner and an output pulse is produced after each 6 input pulses.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A circuit for assembling the individual signals of a group which appear on separate ones of a plurality of signal lines at different times comprising: a plurality of storage means each for receiving the individual signals from a different one of said signal lines, a variable frequency clock associated with each signal line, a frequency comparator for each signal line operative to produce a signal indicative of a difference in the rate that signals are received at its two inputs, means for directly connecting each signal line to an input of its associated frequency comparator, means for connecting the output of the variable frequency clock to the other input of the frequency comparator, means operative for changing the frequency of the variable frequency clock under control of the difference signal generated by the frequency comparator, and means for transmitting signals from each signal line to its associated storage means under control of its associated variable frequency clock.

2. A circuit for assembling the individual signals of a group which appear on separate ones of a plurality of signal lines at different times comprising: a plurality of storage means each for receiving the individual signals from a different one of said signal lines, a variable frequency clock associated with each signal line and operative for continuously producing a first and second train of pulses the second of which is 180° out of phase with the first, means controlled by the first train of pulses for generating saw tooth waves, a frequency comparator for each signal line operative to produce a signal indicative of a difference in the rate that signals are received at its two inputs, means for connecting each signal line to an input of its associated frequency comparator, means for connecting the saw tooth waves to the other input of the frequency comparator, means operative for changing the frequency of the variable frequency clock under control of the difference signal generated by the frequency comparator, and means for transmitting signals from each signal line to its associated storage means under control of the first train of pulses of its associated variable frequency clock.

3. In a magnetic tape unit, a circuit for assembling the information bits of a character read from individual tracks of a magnetic tape comprising: a plurality of storage means each for storing the individual information bits from a different one of said tracks, a variable frequency clock associated with each track, a frequency comparator for each track operative to produce a difference signal indicative of a difference in the rate that signals are received at its two inputs, means for reading information bits from each said track and producing a signal indicative thereof, means for directly applying the information bit signals from each track to an input of its associated frequency comparator, means for connecting the output of each variable frequency clock to the other input of its associated frequency comparator, means operative for changing the frequency of the variable frequency clock under control of the different signals generated by the frequency comparator, and means for transmitting signals from each signal line to its associated storage means under control of its associated variable frequency clock.

4. In a magnetic tape unit, a circuit for assembling the information bits of a character read from individual tracks of a magnetic tape comprising:

a plurality of storage means each for storing the individual information bits from a different one of said tracks;

a variable frequency clock associated with each said track and operative to produce a saw tooth output;

a frequency comparator for each track operative to produce a difference signal indicative of a difference in the rate that signals are received at its two inputs;

means for reading information bits from each said track and producing a signal indicative thereof;

means for applying the information bit signals from each track to an input of its associated frequency comparator;

means for connecting the saw tooth output of each variable frequency clock to the other input of its associated frequency comparator;

means operative for changing the frequency of the variable frequency clock under control of the difference signals generated by the frequency comparator;

and means for transmitting signals from each signal line to its associated storage means under control of its associated variable frequency clock.

5. A circuit for assembling the individual signals of a group which appear on separate ones of a plurality of signal lines at different times comprising:

a plurality of storage means each for receiving the individual signals from a different one of said signal lines;

a variable frequency clock associated with each signal line and operative to produce a saw tooth output;

a frequency comparator for each signal line operative to produce a signal indicative of a difference in the rate that signals are received at its two inputs;

means for directly connecting each signal line to an input of its associated frequency comparator;

means for connecting the saw tooth output of the variable frequency clock to the other input of the frequency comparator;

means operative for changing the frequency of the variable frequency clock under control of the difference signal generated by the frequency comparator; and means for transmitting signals from each signal time to its associated storage means under control of its associated variable frequency clock.

6. In a device of the type described:

variable frequency clock means for continuously generating a saw tooth wave;

an external source of pulses arriving at said device at a variable rate;

means for comparing the position of each external pulse with respect to a saw tooth;

means for directly connecting the external source to said comparing means;

means for connecting the saw tooth wave generating means to the comparing means; and means under control of the comparing means for controlling the rate that the saw tooth wave generating means produces saw tooth waves.

7. In a device of the type described:

means for continuously producing a first and second train of internal pulses, the second of which is 180° out of phase with the first;

means controlled by the first train of internal pulses for generating a saw tooth wave;

an external source of pulses arriving at said device at a variable rate;

means for comparing the position of each external pulse with respect to a saw tooth wave;

means for directly connecting the external source to said comparing means;

means for connecting the saw tooth wave generating means to the comparing means;

means under control of the comparing means for controlling the rate that the saw tooth wave generating means produces saw tooth waves;

storage means; and means for transmitting the external pulses to said storage means under control of the second train of internal pulses.

References Cited by the Examiner

UNITED STATES PATENTS

| | | | |
|---|---|---|---|
| 2,793,344 | 5/57 | Reynolds | 340—174.1 |
| 2,798,216 | 7/57 | Goldberg | 340—347 |
| 2,817,701 | 12/57 | Johnson | 340—174 |
| 2,828,478 | 3/58 | Johnson | 340—174 |
| 2,937,366 | 5/60 | Sims | 340—174 |
| 2,991,452 | 7/61 | Welsh | 340—167 X |

MALCOLM A. MORRISON, *Primary Examiner.*